United States Patent [19]
Sato

[11] Patent Number: 5,314,514
[45] Date of Patent: May 24, 1994

[54] ABRASIVE TAPE

[75] Inventor: Masami Sato, Kanagawa, Japan

[73] Assignee: Fuji Photo Film Co., Ltd., Kanagawa, Japan

[21] Appl. No.: 43,933

[22] Filed: Apr. 8, 1993

[30] Foreign Application Priority Data

May 13, 1992 [JP] Japan .................. 4-120415

[51] Int. Cl.⁵ .............................. B24B 1/00
[52] U.S. Cl. ...................... 51/295; 51/298; 51/308; 51/309; 106/3
[58] Field of Search ........... 51/295, 298, 308, 309; 106/3

[56] References Cited

U.S. PATENT DOCUMENTS

| | | | |
|---|---|---|---|
| 4,903,440 | 2/1990 | Larson et al. | 51/298 |
| 4,930,266 | 6/1990 | Calhoun et al. | 51/293 |
| 4,954,140 | 9/1990 | Kawashima et al. | 51/295 |
| 4,974,373 | 12/1990 | Kawashima et al. | 51/293 |
| 5,028,242 | 7/1991 | Ito et al. | 51/295 |
| 5,123,933 | 6/1992 | Ito et al. | 51/295 |

FOREIGN PATENT DOCUMENTS

62-10782  3/1987 Japan .
62-256219 11/1987 Japan .

OTHER PUBLICATIONS

"Paint Flow and Pigment Dispersion," *Baker Caster Oil Company*, T. C. Patton, 1975, pp. 216-221 and pp. 405-415.

English Language abstract of Japanese Patent Publication No. 62-10782.
English Language abstract of Japanese Unexamined Patent Publication No. 62-256219.

*Primary Examiner*—Mark L. Bell
*Assistant Examiner*—Willie J. Thompson
*Attorney, Agent, or Firm*—Sughrue, Mion, Zinn, Macpeak & Seas

[57] ABSTRACT

An abrasive tape comprises a flexible substrate and an abrasive layer, which is overlaid on the flexible substrate and contains abrasive grains and a binder. The abrasive grains comprise first abrasive grains, which have a mean grain diameter falling within the range of 0.07 $\mu$m to 0.40 $\mu$m and a Molls hardness falling within the range of 5 to 7, second abrasive grains, which have a mean grain diameter falling within the range of 0.20 $\mu$m to 0.60 $\mu$m and a Molls hardness not lower than 8.5, and fine diamond grains, which have a mean grain diameter falling within the range of 0.5 $\mu$m to 3.0 $\mu$m. The proportion of the fine diamond grains is not lower than 4% by weight with respect to the total weight of the first and second abrasive grains. The proportion of the fine diamond grains having grain sizes not larger than 33% of the mean grain diameter is not higher than 6% by volume with respect to the whole volume of the fine diamond grains. Also, the proportion of the fine diamond grains having grain sizes not smaller than 428% of the mean grain diameter is not higher than 5% by volume with respect to the whole volume of the fine diamond grains.

6 Claims, 3 Drawing Sheets

ABRASIVE TAPE

BACKGROUND OF THE INVENTION

1. Field of the Invention

This invention relates to an abrasive tape to be used for polishing a magnetic head, a floppy disk head, a hard disk head, or the like. This invention particularly relates to an abrasive tape to be used for finish polishing a rough-polished surface of a magnetic head, a floppy disk head, a hard disk head, or the like.

2. Description of the Prior Art

Video or high-grade audio magnetic heads are made by being polished with abrasive tapes. The abrasive tape comprises a flexible substrate, and an abrasive layer overlaid on the flexible substrate. In order for the abrasive layer to be provided, an abrasive composition containing abrasive grains, a binder, additives, and the like, is applied onto the flexible substrate and dried.

In general, when the surface of a magnetic head, or the like, is to be polished with the abrasive tape, two reels are positioned with the magnetic head, or the like, intervening therebetween. The abrasive tape is moved between the two reels while it is in contact with the surface to be polished. The abrasive tape is flexible and can snugly fit to a curved surface. Therefore, the abrasive tape is more suitable for the polishing of the curved surface of the magnetic head, or the like, than grinding wheels. Also, the abrasive tape can achieve scratch-free, accurate polishing of the surface to be polished, and is therefore indispensable to finish polishing of a rough-polished surface.

As is well known, polishing processes wherein the abrasive tape is used are carried out for the purposes of, for example, shaping the tip of a magnetic head into a desired form, eliminating the chipping of a magnetic head, and polishing the surface of a magnetic head to a smooth finish. In order for the polishing process to be satisfactorily achieved, it is required that the polishing performance be increased, thereby to shorten the time required for the polishing, and that the smoothness of the polished surface be increased. Abrasive tapes for satisfying such requirements have heretofore been proposed. For example, Japanese Patent Publication No. 62(1987)-10782 discloses an abrasive tape provided with an abrasive layer, which is constituted of a mixture of two kinds of abrasive grains, such that both the polishing performance and the smoothness of the polished surface may be improved.

Figure 6:
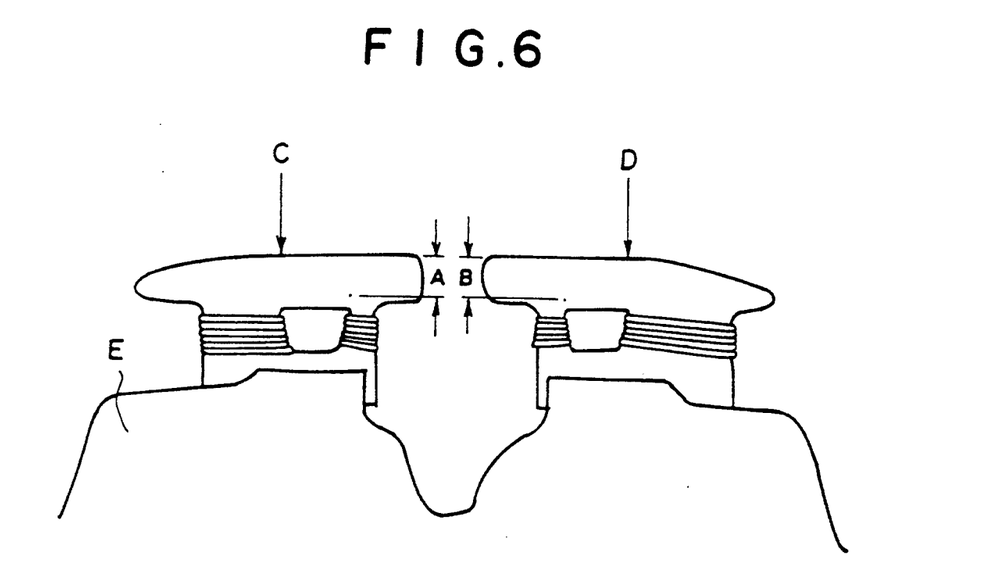
FIG. 6 is a schematic plan view showing a combination head.
Figure 7:
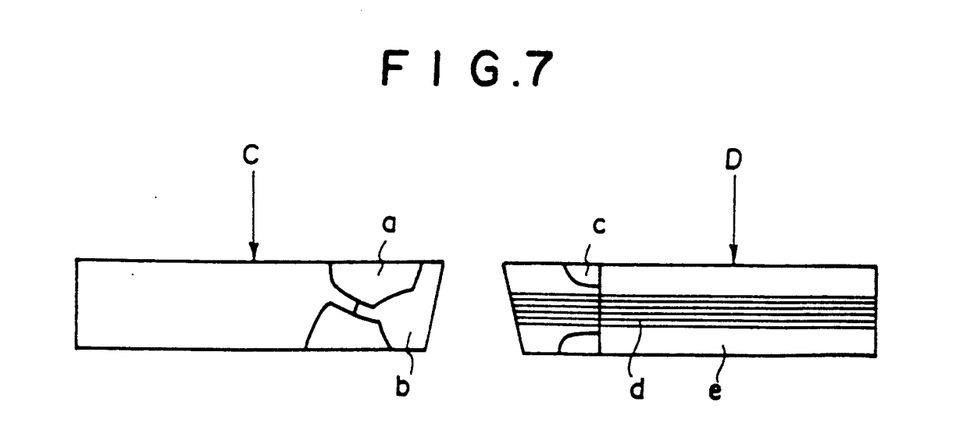
FIG. 7 is a schematic front view showing a combination head.

Recently, rapid advances have been made in the performance of video heads, and a combination head has been developed like that in C Movie NV-M50 supplied by Matsushita Electric Industrial Co., Ltd. FIGS. 6 and 7 are a plan view and a front schematic view showing a combination head. As illustrated in FIGS. 6 and 7, the combination head comprises a combination of an audio head C and a laminated type of amorphous head (video head) D, which are secured to a single head base plate E. The audio head C is composed of a glass material part "a" and a ferrite material part "b." The video head D is composed of a glass material part "c," an amorphous metal material part "d," and a ceramic material part "e." When a finish polishing process is carried out on the combination head, it is necessary that the audio head C and the video head D are polished so as to have the same heights of the polished surfaces, and that the polished surfaces are highly smooth. If the heights of the polished surfaces are not equal to each other, space loss will occur during the magnetic recording and reproducing operations, so that the magnetic recording and reproducing characteristics will be deteriorated.

The abrasive tape disclosed in Japanese Patent Publication No. 62(1987)-10782 has a low polishing performance with respect to the video head of the combination head described above. Therefore, the disclosed abrasive tape has drawbacks in that the audio head and the video head cannot be polished so as to have the same height.

SUMMARY OF THE INVENTION

The primary object of the present invention is to provide an abrasive tape which is suitable for polishing a combination head composed of a video head and an audio head such that the heights of the polished surfaces of the video head and the audio head may become identical with each other, and such that the polished head surfaces may have a highly smooth finish.

Another object of the present invention is to provide an abrasive tape which enables the amount of dispersion in the depth of polishing to be kept small and keeps the yield of non-defective polished heads markedly high during the production of combination heads.

The term "depth of polishing" as used herein means the amount of head material removed by the polishing operation, which amount is taken in the height direction of the head. In FIG. 6, the depth of polishing is indicated by changes in dimensions A and B.

The inventors studied various compositions of abrasive layers of abrasive tapes, and found that the aforesaid objects are accomplished when the distributions of the grain size and the hardness of abrasive grains contained in an abrasive layer are adjusted to specific ranges.

Specifically, the present invention provides an abrasive tape comprising a flexible substrate and an abrasive layer which is overlaid on the flexible substrate and which contains abrasive grains and a binder, wherein the abrasive grains comprise:

i) first abrasive grains, which have a mean grain diameter falling within the range of 0.07 $\mu$m to 0.40 $\mu$m and a Molls hardness falling within the range of 5 to 7, ii) second abrasive grains, which have a mean grain diameter falling within the range of 0.20 $\mu$m to 0.60 $\mu$m and a Molls hardness not lower than 8.5, and iii) fine diamond grains, which have a mean grain diameter falling within the range of 0.5 $\mu$m to 3.0 $\mu$m, the proportion of the weight of the fine diamond grains being not lower than 4% with respect to the total weight of the first abrasive grains and the second abrasive grains.

In the abrasive tape in accordance with the present invention, in the distribution of the grain sizes of the fine diamond grains, the proportion of the volume of the fine diamond grains having grain sizes not larger than 33% of the mean grain diameter should preferably be not higher than 6% with respect to the whole volume of the fine diamond grains contained in the abrasive grains. Also, the proportion of the volume of the fine diamond grains having grain sizes not smaller than 428% of the mean grain diameter should preferably be not higher than 5% with respect to the whole volume of the fine diamond grains contained in the abrasive grains.

With the abrasive tape in accordance with the present invention, the combined use of the first abrasive grains, the second abrasive grains, and the fine diamond grains provides a very smooth finish of the polished surfaces of a combination head. Also, with the abrasive tape in accordance with the present invention, wherein the proportion of the fine diamond grains is not lower than 4% by weight with respect to the total weight of the first abrasive grains and the second abrasive grains, a polishing operation can be carried out on a combination head such that the polished surfaces of a video head and an audio head of the combination head may be aligned with each other at the same heights.

It is considered that the effects described above can be obtained because, when the proportion of the fine diamond grains is adjusted to at least 4% by weight with respect to the total weight of the first abrasive grains and the second abrasive grains, the grinding capacity of the abrasive grains is improved markedly, and as a result the difference in the depth of polishing between the head having comparatively low grindability and the head having comparatively high grindability can be kept at a practically acceptable, small value.

Also, with the abrasive tape in accordance with the present invention, in the distribution of the grain sizes of the fine diamond grains, the volume fraction of the fine diamond grains having grain sizes not larger than 33% of the mean grain diameter is 6% by volume or less with respect to the whole volume of the fine diamond grains contained in the abrasive grains. Additionally, the volume fraction of the fine diamond grains having grain sizes not smaller than 428% of the mean grain diameter is 5% by volume or less with respect to the whole volume of the fine diamond grains contained in the abrasive grains. Therefore, the amount of dispersion in the depth of polishing can be kept small, and the yield of non-defective polished heads can be kept markedly high during the production of combination heads.

In the process for producing combination heads, it is necessary that the amount of dispersion in the depth of polishing of the heads is kept as small as possible, and that the heads having uniform finish quality can be obtained. The specific distribution of the grain sizes of the fine diamond grains employed in the present invention takes large part in keeping the amount of dispersion in the depth of polishing of the heads small.

The fine diamond grains are obtained by pulverizing raw material blocks with a crushing process and classifying the pulverized grains with a wet sedimentation classification process or an air classification process. Therefore, ordinarily, the grain size distribution takes on the form of regular distribution. However, if the volume fraction of the fine diamond grains having grain sizes not larger than 33% of the mean grain diameter is higher than 6% by volume with respect to the whole volume of the fine diamond grains contained in the abrasive grains, the depth of polishing of heads will decrease markedly. If the volume fraction of the fine diamond grains having grain sizes not smaller than 428% of the mean grain diameter is larger than 5% by volume with respect to the whole volume of the fine diamond grains contained in the abrasive grains, the depth of polishing of heads will increase markedly. Therefore, in the latter case, the depth of polishing will fluctuate largely, and combination heads having uniform quality cannot be obtained.

The first abrasive grains may be formed of $\alpha$-$Fe_2O_3$, $TiO_2$, $SiO_2$, $SnO_2$, or the like. The second abrasive grains may be formed of $Cr_2O_3$, $Al_2O_3$, SiC, or the like. The fine diamond grains may be constituted of artificial diamond, reprocessed diamond, or the like.

The proportion of the total weight of the first abrasive grains, the second abrasive grains, and the fine diamond grains with respect to the weight of total solids, which are contained in the abrasive layer comprising the abrasive grains and the binder, should preferably be within the range of 85% to 95%, and should more preferably be within the range of 90% to 95%. If said proportion is lower than 80%, good polishing performance of the abrasive tape cannot be obtained. If said proportion is higher than 95%, the abrasive grains will readily separate from the abrasive layer, and the polished surface will be detrimentally scratched by the separated abrasive grains. Also, the surface roughness (Ra) of the abrasive layer should preferably be within the range of 0.046 $\mu$m to 0.130 $\mu$m.

DESCRIPTION OF THE PREFERRED EMBODIMENTS

The present invention will hereinbelow be described in further detail with reference to the accompanying drawings.

Figure 2:
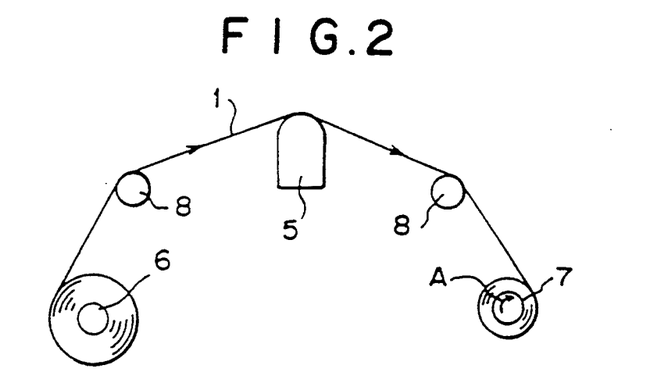
FIG. 2 is a schematic view showing an example of the polishing apparatus wherein the abrasive tape of FIG. 1 is employed.

FIG. 2 is a schematic view showing an example of the polishing apparatus wherein an embodiment of the abrasive tape in accordance with the present invention is employed.

With reference to FIG. 2, a tape wind-up reel 7 is rotated in the direction indicated by the arrow A, and an abrasive tape 1 is fed from a tape feed roll 6 in the direction indicated by the arrow. The abrasive tape 1 is threaded over pass rolls 8, 8 so that it may be brought into contact with a magnetic head 5, which is to be polished, at a predetermined lap angle. In this manner, the surface of the magnetic head 5, on which the abrasive tape 1 slides, is polished by the abrasive tape 1.

Figure 1:
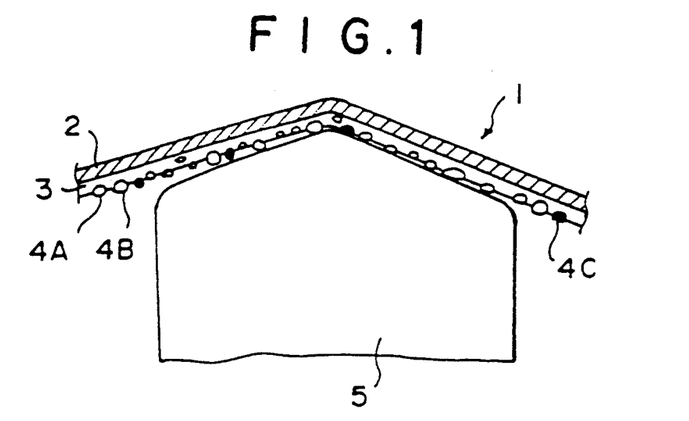
FIG. 1 is an explanatory view showing an embodiment of the abrasive tape in accordance with the present invention and a magnetic head to be polished.

FIG. 1 is an explanatory view showing the cross-sectional structure of the abrasive tape 1. As shown in FIG. 1, the abrasive tape 1 comprises a flexible non-magnetic substrate 2 and an abrasive layer 3 overlaid on the flexible non-magnetic substrate 2. The flexible substrate may be constituted of a polyethylene terephthalate (PET), a polyethylene-2,6-naphthalate, a polyethylene, a polypropylene, a polycarbonate, a polyethylene naphthalate, a polyamide, a polyamide imide, a polyimide, a polysulfone, a polyether sulfone, or the like. The abrasive layer 3 slides on the magnetic head 5 and polishes it. The abrasive layer 3 comprises first abrasive grains 4A having a comparatively low hardness and comparatively small diameters, second abrasive grains 4B having a comparatively high hardness and comparatively large diameters, fine diamond grains 4C having a high hardness, and a binder or the like, which have been kneaded together and applied onto the flexible non-magnetic substrate 2. The first abrasive grains 4A have a mean grain diameter falling within the range of 0.07/Am to 0.40 μm and a Molls hardness falling within the range of 5 to 7. The second abrasive grains 4B have a mean grain diameter falling within the range of 0.20 μm to 0.60 μm and a Mohs hardness not lower than 8.5. The fine diamond grains have a mean grain diameter falling within the range of 0.5 μm to 3.0 μm. The binder should have good dispersing quality in order to disperse the first abrasive grains, the second abrasive grains, and the fine diamond grains substantially in the abrasive layer 3 and adhere them to the abrasive layer 3.

The proportion of the fine diamond grains 4C is set at 4% by weight or more with respect to the total weight of the first abrasive grains 4A and the second abrasive grains 4B.

In cases were the proportion of the fine diamond grains 4C is adjusted to at least 4% by weight with respect to the total weight of the first abrasive grains 4A and the second abrasive grains 4B, the grinding capacity of the abrasive grains is improved markedly. As a result, the difference in the depth of polishing between the head having comparatively low grindability and the head having comparatively high grindability can be kept at a practically acceptable, small value. Therefore, the polishing operation can be carried out such that the polished surfaces of the video head and the audio head of the combination head may have the same heights.

Also, in the distribution of the grain sizes of the fine diamond grains 4C, the proportion of the volume of the fine diamond grains 4C having grain sizes not larger than 33% of the mean grain diameter is 6% or less with respect to the whole volume of the fine diamond grains 4C contained in the abrasive grains. Additionally, the proportion of the volume of the fine diamond grains 4C having grain sizes not smaller than 428% of the mean grain diameter is 5% or less with respect to the whole volume of the fine diamond grains 4C contained in the abrasive grains.

In cases where the distribution of the grain sizes of the fine diamond grains 4C is adjusted in the manner described above, the amount of dispersion in the depth of polishing can be kept small, and the yield of non-defective polished heads can be kept markedly high during the production of combination heads.

The abrasive tape described above can be used even during a finish polishing process on a laminated type of video head, which is constituted of materials having different levels of hardness, e.g., a ceramic material, an amorphous alloy material, and a glass material. In such cases, a uniform polished surface can be obtained such that no difference in level may occur at boundaries between parts having different hardnesses, i.e. at the boundary between the ceramic part and the amorphous alloy part and at the boundary between the ceramic part and the glass part.

As the binder contained in the abrasive layer of the abrasive tape in accordance with the present invention, any of various binder resins known in the art may be used.

These binder resins include thermoplastic resins, thermosetting resins, and reactive resins. These binder resins may be used along or as a combination of two or more of these resins.

The thermoplastic resins which may be used as the binder in the abrasive layer of the abrasive tape in accordance with the present invention generally have a softening point of 150° C. or lower, an average molecular weight falling within the range of approximately 10,000 to approximately 300,000, and a polymerization degree falling within the range of approximately 50 to approximately 2,000. Such thermoplastic resins include a polymer of a (meth)acrylic ester, (meth)acrylonitrile, butadiene, a vinyl ester, (meth)acrylamide, vinyl chloride, vinylidene chloride, or the like; a polymer of a derivative of such a monomer; a copolymer of such monomers; and a copolymer of such a monomer with other monomers copolymerizable with such a monomer. Specifically, as the thermoplastic resin, it is possible to use, for example, a vinyl chloride-vinyl acetate copolymer, a vinyl chloride copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a chlorovinyl ether-acrylic ester copolymer, an amino resin, a synthetic rubber type thermoplastic resin, or a mixture of two or more of these compounds.

The thermosetting resins or the reactive resins which may be used as the binder in the abrasive layer of the abrasive tape in accordance with the present invention generally have a molecular weight of 200,000 or less when the resins takes on the form of coating compositions. When the coating compositions are applied onto substrates and dried, the resins are capable of undergoing the condensation reactions, the addition reactions, or the like. Specifically, the thermosetting resins or the reactive resins include, for example, a phenol resin, a phenoxy resin, an epoxy resin, a polyurethane hardening resin, a urea resin, a melamine resin, an alkyd resin, a silicone resin, an acrylic reactive resin, an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

Also, known electron beam curing resins may be used. Their examples and how to prepare them are described in detail in Japanese Unexamined Patent Publication No. 62(1987)-256219.

The thermoplastic resins, the thermosetting resins, and the reactive resins described above should preferably have polar groups described below in addition to their major functional groups. In the present invention, a polar group-containing resin should preferably be used such that the interaction between the resin and the abrasive grains may be enhanced, such that the dispersion properties may be improved, and such that an abrasive layer having good integrity through interaction with the compound in the present invention. The resin should preferably has one to six kinds of the polar groups, and each of the polar groups should preferably be contained in proportions falling within the range of $1\times10^{-6}$ equivalent to $1\times10^{-2}$ equivalent per gram of the resin. The polar groups include acid groups (which may take on the form of Na salts, or the like), such as a carboxylic acid group, a sulfenic acid group, a sulfonic acid group, a phosphoric acid group, a sulfuric acid group, a phosphonic acid group, a phosphinic acid group, a boric acid group, a sulfuric ester group, a phosphoric ester group, and alkyl ester groups of these acid groups; groups of amphoteric compounds, such as a group of an amino acid, a group of an aminosulfonic acid, a group of a sulfuric ester of amino-alcohol, a group of a phosphoric ester of amino-alcohol, and an alkyl betaine form group; basic groups, such as an amino group, an imino group, an imido group, and an amido group; an epoxy group producing a hydroxyl group through reaction; a hydroxyl group; an alkoxyl group; a thiol group; halogen groups; a silyl group; and a siloxane group. Particularly preferable polar groups are an epoxy group and an —$SO_3M$ group, or the like, wherein M represents H, an alkali metal such as Na or K, or an ammonium ion. These polar groups can be introduced into the resin by carrying out copolymerization (or co-polycondensation) using a monomer, which contains a polar group, or by utilizing a polymer reaction.

In the present invention, the resins containing the polar groups should preferably be vinyl chloride resins or polyurethane resins. The polar group should preferably be the epoxy group or the —$SO_3M$ group.

The vinyl chloride resins should preferably be epoxy group-containing vinyl chloride copolymers, such as vinyl chloride copolymers having a vinyl chloride repeating unit, a repeating unit having the epoxy group, and a repeating unit having the —$SO_3M$ group, wherein M has the same meaning as that described above and should preferably be Na.

The proportions of the polar group contained in the polar group-containing resin should preferably fall within the range of $1\times10^{-6}$ equivalent to $1\times10^{2}$ equivalent per gram of the resin. The molecular weight of the polar group-containing resin should preferably fall within the range of 10,000 to 200,000.

The polyurethane resins containing the polar groups can be prepared from polyols, such as polyether diols, polyester diols, polycarbonate diols, and polycaprolacton diols, and polyisocyanates, such as diisocyanates. When necessary, chain-lengthening agents, such as polyhydric alcohols, aliphatic polyamines, alicyclic polyamines, and aromatic polyamines, may be used together with the polyols and the diisocyanates. The polar groups can be introduced into the resin by using one of various means.

For example, in order for the polyurethane resins containing the polar groups to be prepared, the polar groups may be introduced into the polyester polyols by using polybasic acids or polyols, which contain the polar groups. The polyester polyols and the polyisocyanate compounds may then be reacted with each other. The polyisocyanate compounds can be used as the constituents of the polyurethane resins and as cross linking agents for forming three-dimensional network structures of the resins. Also, in the present invention, any of hardeners may be used.

Also, additives such as a lubricant should preferably be added to the abrasive layer 3 such that the abrasive layer 3 may exhibit good lubricity with respect to the magnetic head 5 and good movement stability. Preferable thicknesses of the abrasive layer 3 and the flexible non-magnetic substrate 2 vary depending on to what shape the magnetic head 5 is to be polished. In cases where the abrasive tape 1 is to be used for finish polishing of an S-VHS system magnetic head, the thickness of the abrasive layer 3 should preferably be approximately 5 mm when the thickness of the flexible non-magnetic substrate 2 is 30 $\mu$m. Also, the thickness of the abrasive layer 3 should preferably be approximately 10 $\mu$m when the thickness of the flexible non-magnetic substrate 2 is 23 $\mu$m. If the thickness of the abrasive layer 3 is excessively large, the abrasive tape 1 cannot snugly fit to the magnetic head 5. Therefore, the thickness of the abrasive layer 3 should preferably be not larger than 50 $\mu$m.

Particularly, in the abrasive tape in accordance with the present invention, the thickness of the abrasive layer after being dried should preferably be not larger than the mean grain diameter of the fine diamond grains. As described above, the mean grain diameter of the fine diamond grains is larger than the mean grain diameters of the first abrasive grains and the second abrasive grains. Therefore, in cases where the thickness of the abrasive layer after being dried is not larger than the mean grain diameter of the fine diamond grains, the fine diamond grains predominantly appear on or project from the surface of the abrasive layer. As a result, even if the amount of the fine diamond grains contained in the abrasive layer is small, the fine diamond grains can work efficiently.

In the present invention, an organic solvent may be used in any proportion during the processes for dispersing and kneading the abrasive grains, the binder resin, and the like, and during the process for applying the resulting coating composition. Such organic solvents include ketones, such as acetone, methyl ethyl ketone, methyl isobutyl ketone, and cyclohexanone; alcohols, such as methyl alcohol, ethyl alcohol, and butyl alcohol; esters, such as methyl acetate, ethyl acetate, butyl acetate, ethyl lactate, and glycol acetate monoethyl ether; ethers, such as ethyl ether, ethylene glycol dimethyl ether, ethylene glycol monoethyl ether, and dioxane; aromatic hydrocarbons, such as benzene, toluene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, hexane, and the like.

The abrasive layer of the abrasive tape in accordance with the present invention may contain additives, such as lubricants and dispersing agents.

When the coating composition constituted of the abrasive grains, the binder resin, the organic solvent, the additives, and the like, is prepared for the formation of the abrasive layer, any of known dispersing and mixing processes may be employed. For example, several compositions containing different constituents may be prepared first and may later be mixed with each other. One of various types of kneading machines may be used to carry out the kneading and dispersing processes on the coating composition. For example, it is possible to use a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a homogenizer, or an ultrasonic dispersing machine.

In order for the abrasive layer to be formed on the substrate, it is possible to employ any of known processes, for example, the processes described in "Coating Kogaku" (Coating Engineering), 1971, published by Asakura Shoten.

The coating composition having been prepared in the manner described above may be applied onto the substrate by using any of coating processes, for example, air doctor coating, blade coating, air-knife coating, swing coating, impregnation coating, reverse-roll coating, transfer roll coating, gravure coating, kiss-roll coating, spray coating, bar coating, or spin coating.

As the techniques for the kneading, dispersion, and coating, multi-layer simultaneous coating processes are described in, for example, "Paint Flow and Pigment Dispersion" by T. C. Patton, 1975. Such a multi-layer simultaneous coating process may be employed during the formation of the abrasive layer. The dry thickness of the abrasive layer may be determined in accordance with the applications in which the abrasive tape is to be used, the shape of the abrasive tape, and the standard requirements for the abrasive tape.

When necessary, the abrasive layer, which has been overlaid on the substrate in the manner described above, may be subjected to surface treatment. Also, when necessary, the abrasive layer may be subjected to a hardening process, such as heat treatment, exposure to electron beams, or the like. Thereafter, the abrasive layer overlaid on the substrate is cut into a desired shape, and the abrasive tape in accordance with the present invention is thereby produced.

Figure 3:
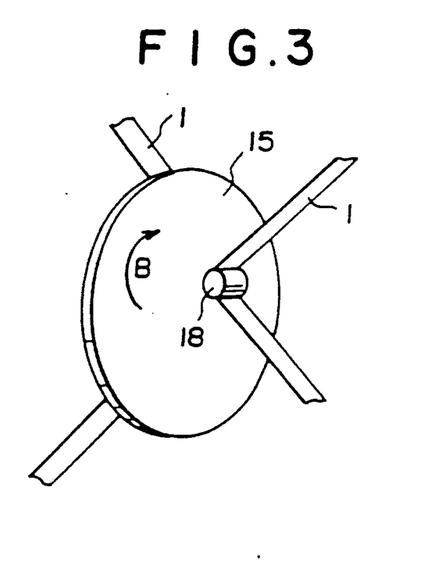
FIG. 3 is a schematic perspective view showing an example of the polishing apparatus different from that of FIG. 2, wherein the abrasive tape of FIG. 1 is employed.
Figure 4:
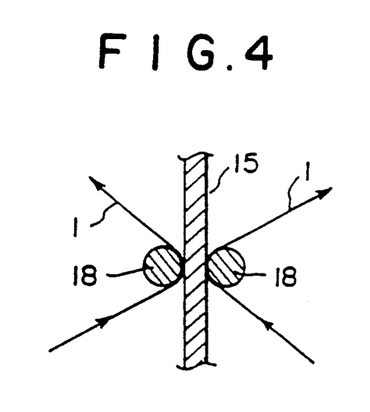
FIG. 4 is a sectional side view of the polishing apparatus shown in FIG. 4.

The abrasive tape 1 in accordance with the present invention is suitable particularly for the polishing of a magnetic head having a high performance. However, the abrasive tape 1 in accordance with the present invention may also be used for polishing a hard disk 15 in the manner shown in FIGS. 3 and 4. In cases where the hard disk 15 is to be polished, it is sandwiched between rubber rollers 18, 18, and the abrasive layers of the abrasive tapes 1, 1 are pushed by the rubber rollers 18, 18 against both surfaces of the hard disk 15. The hard disk 15 is then rotated in the direction indicated by the arrow B so that both surfaces of the hard disk 15 are polished simultaneously. In this case, pushing force larger than the pushing force exerted to the magnetic head 1 shown in FIGS. 1 and 2 is given to the hard disk 15 which is to be polished. However, since each of the abrasive tapes 1, 1 in accordance with the present invention is provided with the two types of the abrasive grains as described above, there is no risk of the hard disk 15 being scratched detrimentally.

The present invention will further be illustrated by the following non-limitative examples. In these examples, abrasive tapes were made under different conditions described below. The term "parts" as used hereinbelow means parts by weight of solids.

Example 1

An abrasive coating composition as shown below was applied to a thickness of 3 $\mu$m onto a 30 $\mu$m-thick polyethylene terephthalate (PET) substrate, and dried to form an abrasive layer. The substrate on which the abrasive layer has been overlaid was slit to a width of ½ inch, and an abrasive tape was thereby made.

| Abrasive coating composition: | |
|---|---|
| $\alpha$-Fe$_2$O$_3$ abrasive grains (first abrasive grains) (granular, mean grain diameter: 0.11 $\mu$m, Mohs hardness: 5.0) | 238.0 parts |
| Cr$_2$O$_3$ abrasive grains (second abrasive grains) (granular, mean grain diameter: 0.30 $\mu$m, Mohs hardness: 8.5) | 79.3 parts |
| Fine diamond grains (polycrystalline artificial diamond grains) (granular, mean grain diameter: 0.91 $\mu$m, Mohs hardness: 10.0) (volume fraction of grains having a grain diameter of 0.30 $\mu$m or less: 6 vol %) (volume fraction of grains having a grain diameter of 3.90 $\mu$m or more: 5 vol %) | 12.7 parts |
| Vinyl chloride resin (vinyl chloride having an average molecular weight of 2.6 $\times$ 10$^4$: 87 wt %, epoxy group content: 3.5 wt %, sodium sulfonate group content: 0.5 wt %, where wt % is a value with respect to the weight of the vinyl chloride resin) | 90 parts |
| Sulfonic acid group-containing polyurethane resin (molecular weight: 25,000, molecular weight per —SO$_3$H: 25,000) | 5.2 parts |
| Polyisocyanate (solid contents in a 75 wt % ethyl acetate solution of a reaction product of 3 mols of 2,4-tolylene diisocyanate compound with 1 mol of trimethylolpropane) | 10.4 parts |
| C$_{16}$H$_{33}$O(CH$_2$CH$_2$O)$_{10}$H | 3.1 parts |
| Methyl ethyl ketone | 118.7 parts |
| Cyclohexanone | 107.9 parts |

Example 2

An abrasive tape was made under the same conditions as those in Example 1, except that the fine diamond grains were replaced by those described below.

| | |
|---|---|
| Fine diamond grains (polycrystalline artificial diamond grains) (granular, mean grain diameter: 0.91 $\mu$m, Mohs hardness: 10.0) (volume fraction of grains having a grain diameter of 0.30 $\mu$m or less: 5 vol %) (volume fraction of grains having a grain diameter of 3.90 $\mu$m or more: 5 vol %) | 12.7 parts |

Example 3

An abrasive tape was made under the same conditions as those in Example 1, except that the fine diamond grains were replaced by those described below.

| | |
|---|---|
| Fine diamond grains (polycrystalline artificial diamond grains) (granular, mean grain diameter: 0.91 $\mu$m, Mohs hardness: 10.0) (volume fraction of grains having a grain diameter of 0.30 $\mu$m or less: 5 vol %) (volume fraction of grains having a grain diameter of 3.90 $\mu$m or more: 4 vol %) | 12.7 parts |

Example 4

An abrasive tape was made under the same conditions as those in Example 1, except that the first abrasive grains, the second abrasive grains, and the fine diamond grains were replaced by those described below.

| | |
|---|---|
| α-Fe$_2$O$_3$ abrasive grains<br>(first abrasive grains)<br>(granular, mean grain diameter: 0.11 μm,<br>Mohs hardness: 5.0) | 225.0 parts |
| Cr$_2$O$_3$ abrasive grains<br>(second abrasive grains)<br>(granular, mean grain diameter: 0.30 μm,<br>Mohs hardness: 8.5) | 75.0 parts |
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 6 vol %)<br>(volume fraction of grains having a grain<br>diameter of 3.90 μm or more: 5 vol %) | 30.0 parts |

Example 5

An abrasive tape was made under the same conditions as those in Example 4, except that the fine diamond grains were replaced by those described below.

| | |
|---|---|
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 5 vol %)<br>(volume fraction of grains having a grain<br>diameter of 3.90 μm or more: 5 vol %) | 30.0 parts |

Example 6

An abrasive tape was made under the same conditions as those in Example 4, except that the fine diamond grains were replaced by those described below.

| | |
|---|---|
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 5 vol %)<br>(volume fraction of grains having a grain<br>diameter of 3.90 μm or more: 4 vol %) | 30.0 parts |

Example 7

An abrasive tape was made under the same conditions as those in Example 1, except that the first abrasive grains, the second abrasive grains, and the fine diamond grains were replaced by those described below.

| | |
|---|---|
| α-Fe$_2$O$_3$ abrasive grains<br>(first abrasive grains)<br>(granular, mean grain diameter: 0.11 μm,<br>Mohs hardness: 5.0) | 206.3 parts |
| Cr$_2$O$_3$ abrasive grains<br>(second abrasive grains)<br>(granular, mean grain diameter: 0.30 μm,<br>Mohs hardness: 8.5) | 68.7 parts |
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 6 vol %)<br>(volume fraction of grains having a grain<br>diameter of 3.90 μm or more: 5 vol %) | 55.0 parts |

Example 8

An abrasive tape was made under the same conditions as those in Example 7, except that the fine diamond grains were replaced by those described below.

| | |
|---|---|
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 5 vol %)<br>(volume fraction of grains having a grain<br>diameter of 3.90 μm or more: 5 vol %) | 55.0 parts |

Example 9

An abrasive tape was made under the same conditions as those in Example 7, except that the fine diamond grains were replaced by those described below.

| | |
|---|---|
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 5 vol %)<br>(volume fraction of grains having a grain<br>diameter of 3.90 μm or more: 4 vol %) | 55.0 parts |

Comparative Example 1

An abrasive tape was made under the same conditions as those in Example 1, except that the first abrasive grains, the second abrasive grains, and the fine diamond grains were replaced by those described below.

| | |
|---|---|
| α-Fe$_2$O$_3$ abrasive grains<br>(first abrasive grains)<br>(granular, mean grain diameter: 0.11 μm,<br>Mohs hardness: 5.0) | 245.0 parts |
| Cr$_2$O$_3$ abrasive grains<br>(second abrasive grains)<br>(granular, mean grain diameter: 0.30 μm,<br>Mohs hardness: 8.5) | 81.7 parts |
| Fine diamond grains<br>(polycrystalline artificial diamond grains)<br>(granular, mean grain diameter: 0.91 μm,<br>Mohs hardness: 10.0)<br>(volume fraction of grains having a grain<br>diameter of 0.30 μm or less: 6 vol %)<br>(volume fraction of grains having a grain<br>diameter of 3.90 μm or more: 5 vol %) | 3.3 parts |

Comparative Example 2

An abrasive tape was made under the same conditions as those in Example 1, except that the first abrasive grains, the second abrasive grains, and the fine diamond grains were replaced by those described below.

| | |
|---|---|
| α-Fe$_2$O$_3$ abrasive grains<br>(first abrasive grains)<br>(granular, mean grain diameter: 0.11 μm,<br>Mohs hardness: 5.0) | 240.3 parts |
| Cr$_2$O$_3$ abrasive grains<br>(second abrasive grains) | 80.1 parts |

-continued

| | |
|---|---|
| (granular, mean grain diameter: 0.30 μm, Mohs hardness: 8.5) | |
| Fine diamond grains | 9.6 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 6 vol %) | |
| (volume fraction of grains having a grain diameter of 3.90 μm or more: 5 vol %) | |

Comparative Example 3

An abrasive tape was made under the same conditions as those in Example 1, except that the fine diamond grains were replaced by those described below.

| | |
|---|---|
| Fine diamond grains | 12.7 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 7 vol %) | |
| (volume fraction of grains having a grain diameter of 3.90 μm or more: 5 vol %) | |

Comparative Example 4

An abrasive tape was made under the same conditions as those in Example 1, except that the fine diamond grains were replaced by those described below.

| | |
|---|---|
| Fine diamond grains | 12.7 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 8 vol %) | |
| (volume fraction of grains having a grain diameter of 3.90 μm or more: 5 vol %) | |

Comparative Example 5

An abrasive tape was made under the same conditions as those in Example 1, except that the fine diamond grains were replaced by those described below.

| | |
|---|---|
| Fine diamond grains | 12.7 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 6 vol %) | |
| (volume fraction of grains having a grain diameter of 3.90 μm or more: 6 vol %) | |

Comparative Example 6

An abrasive tape was made under the same conditions as those in Example 1, except that the fine diamond grains were replaced by those described below.

| | |
|---|---|
| Fine diamond grains | 12.7 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 6 vol %) | |
| (volume fraction of grains having a grain diameter of 3.90 μm or more: 7 vol %) | |

Comparative Example 7

An abrasive tape was made under the same conditions as those in Example 4, except that the fine diamond grains were replaced by those described below.

| | |
|---|---|
| Fine diamond grains | 30.0 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 7 vol %) | |
| (volume fraction of grains having a grain diameter of 3.90 μm or more: 5 vol %) | |

Comparative Example 8

An abrasive tape was made under the same conditions as those in Example 4, except that the fine diamond grains were replaced by those described below.

| | |
|---|---|
| Fine diamond grains | 30.0 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 8 vol %) | |
| (volume fraction of grains having a grain diameter of 3.90 μm or more: 5 vol %) | |

Comparative Example 9

An abrasive tape was made under the same conditions as those in Example 4, except that the fine diamond grains were replaced by those described below.

| | |
|---|---|
| Fine diamond grains | 30.0 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 6 vol %) | |
| (volume fraction of grains having a grain diameter of 3.90 μm or more: 6 vol %) | |

Comparative Example 10

An abrasive tape was made under the same conditions as those in Example 4, except that the fine diamond grains were replaced by those described below.

| | |
|---|---|
| Fine diamond grains | 30.0 parts |
| (polycrystalline artificial diamond grains) | |
| (granular, mean grain diameter: 0.91 μm, Mohs hardness: 10.0) | |
| (volume fraction of grains having a grain diameter of 0.30 μm or less: 6 vol %) | |
| (volume fraction of grains having a grain diameter of 3.90 μm or more: 7 vol %) | |

Comparative Example 11

An abrasive tape was made under the same conditions as those in Example 7, except that the fine diamond grains were replaced by those described below.

| | |
|---|---|
| Fine diamond grains | 55.0 parts |
| (polycrystalline artificial diamond grains) | |
| (granular, mean grain diameter: 0.91 μm, | |
| Mohs hardness: 10.0) | |
| (volume fraction of grains having a grain | |
| diameter of 0.30 μm or less: 7 vol %) | |
| (volume fraction of grains having a grain | |
| diameter of 3.90 μm or more: 5 vol %) | |

Comparative Example 12

An abrasive tape was made under the same conditions as those in Example 7, except that the fine diamond grains were replaced by those described below.

| | |
|---|---|
| Fine diamond grains | 55.0 parts |
| (polycrystalline artificial diamond grains) | |
| (granular, mean grain diameter: 0.91 μm, | |
| Mohs hardness: 10.0) | |
| (volume fraction of grains having a grain | |
| diameter of 0.30 μm or less: 8 vol %) | |
| (volume fraction of grains having a grain | |
| diameter of 3.90 μm or more: 5 vol %) | |

Comparative Example 13

An abrasive tape was made under the same conditions as those in Example 7, except that the fine diamond grains were replaced by those described below.

| | |
|---|---|
| Fine diamond grains | 55.0 parts |
| (polycrystalline artificial diamond grains) | |
| (granular, mean grain diameter: 0.91 μm, | |
| Mohs hardness: 10.0) | |
| (volume fraction of grains having a grain | |
| diameter of 0.30 μm or less: 6 vol %) | |
| (volume fraction of grains having a grain | |
| diameter of 3.90 μm or more: 6 vol %) | |

Comparative Example 14

An abrasive tape was made under the same conditions as those in Example 7, except that the fine diamond grains were replaced by those described below.

| | |
|---|---|
| Fine diamond grains | 55.0 parts |
| (polycrystalline artificial diamond grains) | |
| (granular, mean grain diameter: 0.91 μm, | |
| Mohs hardness: 10.0) | |
| (volume fraction of grains having a grain | |
| diameter of 0.30 μm or less: 6 vol %) | |
| (volume fraction of grains having a grain | |
| diameter of 3.90 μm or more: 7 vol %) | |

Figure 5:
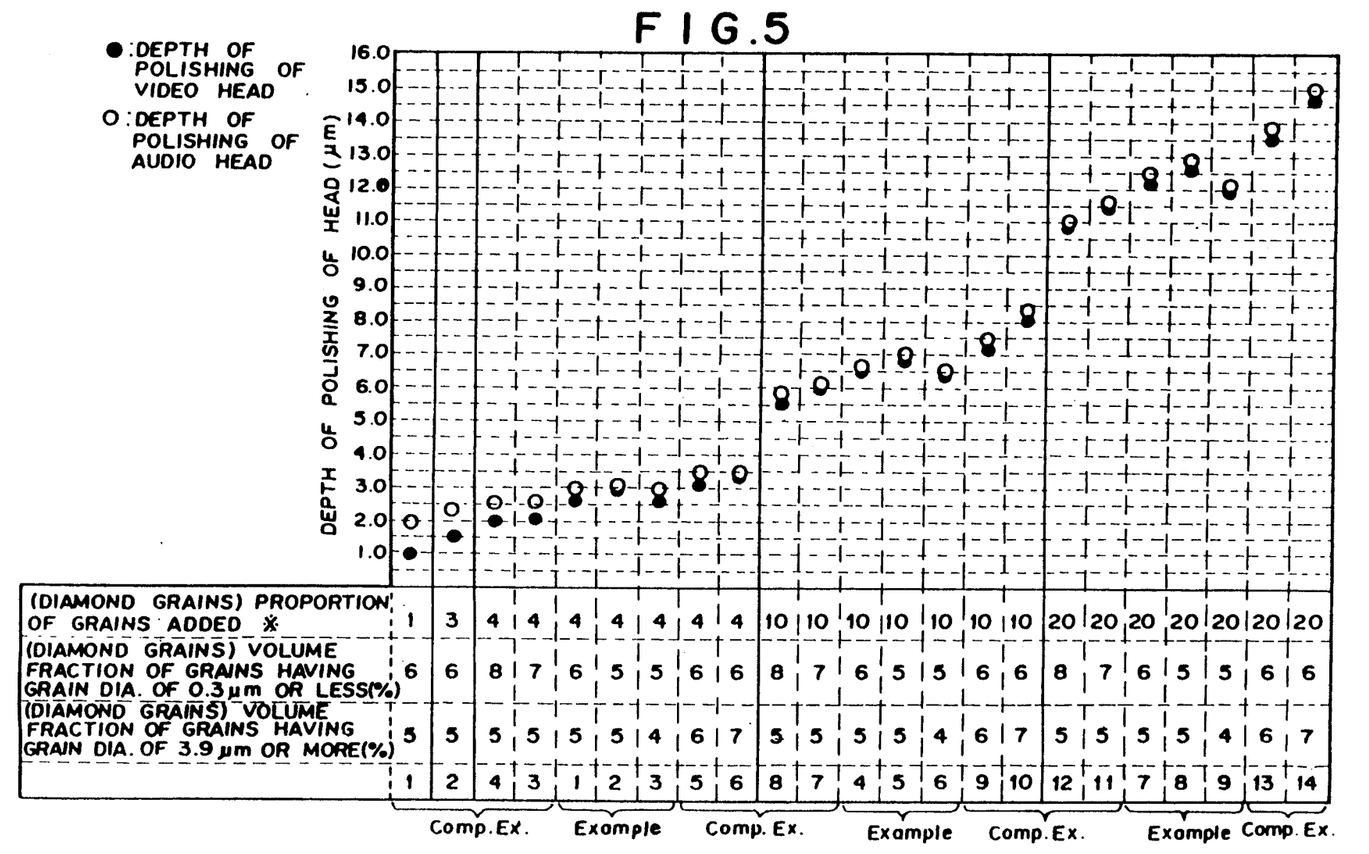
FIG. 5 is a graph showing the depths of polishing of heads shown in Table 1.

Table 1 shows the abrasive grain compositions of the abrasive tapes, which have been made in Examples 1 through 9 and Comparative Examples 1 through 14, and the results of evaluation of the polishing characteristics of the abrasive tapes with respect to finish polishing of combination heads. FIG. 5 is a graph showing depths of polishing of the combination heads shown in Table 1. In FIG. 5, the numerals shown in the bottom line of the table attached to the graph indicate example numbers where "Comp. Ex." shows the numbers of the comparative examples and "Example" shows the numbers of the examples of the invention.

In order for the polishing characteristics of the abrasive tapes with respect to the combination heads to be investigated, each of the abrasive tapes, which had been made in Examples 1 through 9 and Comparative Examples 1 through 14, was loaded into a polishing apparatus. A finish polishing process was then carried out under predetermined conditions on each of the combination heads, which had already been roughly polished. During the finish polishing process, the depths of polishing of the video head and the audio head of the combination head were determined.

The depths of polishing of the video head and the audio head were determined by calculating the amounts of changes in the dimensions A and B shown in FIG. 6 before the finishing polishing process was carried out and after the finishing polishing process was carried out. In the tests for all of the abrasive tapes, the determination of the depths of polishing of the combination heads was carried out under the same polishing conditions.

In FIG. 5, the proportion of the fine diamond grains added is expressed in terms of the percentage (% by weight) of the weight of the fine diamond grains added with respect to the total weight of the first abrasive grains and the second abrasive grains. As is clear from FIG. 5, in cases where the proportion of the fine diamond grains added is lower than 4% by weight, i.e., is 3% by weight (as in Comparative Example 2) or 1% by weight (as in Comparative Example 1), the difference between the depths of polishing of the video head and the audio head becomes very larger than in Example 1. Specifically, the abrasive tapes obtained from Comparative Examples 2 and 1 cannot polish the video head and the audio head such that the heights of their polished surfaces may be identical with each other. As in Examples 1, 4, and 7, in cases where the proportion of the fine diamond grains added is 4% by weight or higher, the difference between the depths of polishing of the video head and the audio head can be kept at a practically acceptable, small level.

When Comparative examples 3 and 4 are compared with Examples 1 and 2, when Comparative examples 7 and 8 are compared with Examples 4 and 5, and when Comparative examples 11 and 12 are compared with Examples 7 and 8, it is revealed that, if the volume fraction of the fine diamond grains having a grain diameter of 0.3 μm (which grain diameter corresponds to 33% of the mean grain diameter, 0.91 μm, of the fine diamond grains) or less is higher than 6% by volume with respect to the total volume of the fine diamond grains, the depths of polishing of the video head and the audio head become markedly small. In such cases, fluctuations during the production cannot be kept small, and polished combination heads having uniform quality cannot be obtained.

When Comparative examples 6 and 7 are compared with Examples 2 and 3, when Comparative examples 9 and 10 are compared with Examples 5 and 6, and when Comparative examples 13 and 14 are compared with Examples 8 and 9, it is revealed that, if the volume fraction of the fine diamond grains having a grain diameter of 3.9 μm (which grain diameter corresponds to 429% of the mean grain diameter, 0.91 μm, of the fine diamond grains) or more is higher than 5% by volume with respect to the total volume of the fine diamond grains, the depths of polishing of the video head and the audio head become markedly large. In such cases, fluctuations during the production cannot be kept small, and polished combination heads having uniform quality cannot be obtained.

TABLE 1

| | Composition of abrasive grains and fine diamond grains | | | | | Depth of polishing of combination head | |
|---|---|---|---|---|---|---|---|
| | | | | Fine diamond grains | | | |
| | Parts by weight of first abrasive grains (α-Fe₂O₃) | Parts by weight of second abrasive grains (Cr₂O₃) | Parts by weight added | Volume fraction of grains having grain dia. of 0.3 μm or less (%) | Volume fraction of grains having grain dia. of 3.9 μm or more (%) | Depth of polishing of video head (μm) | Depth of polishing of audio head (μm) |
| Example 1 | 238.0 | 79.3 | 12.7 | 6 | 5 | 2.6 | 2.9 |
| Example 2 | 238.0 | 79.3 | 12.7 | 5 | 5 | 2.8 | 3.1 |
| Example 3 | 238.0 | 79.3 | 12.7 | 5 | 4 | 2.6 | 2.9 |
| Example 4 | 225.0 | 75.0 | 30.0 | 6 | 5 | 6.5 | 6.7 |
| Example 5 | 225.0 | 75.0 | 30.0 | 5 | 5 | 6.8 | 7.1 |
| Example 6 | 225.0 | 75.0 | 30.0 | 5 | 4 | 6.3 | 6.6 |
| Example 7 | 206.3 | 68.7 | 55.0 | 6 | 5 | 12.2 | 12.5 |
| Example 8 | 206.3 | 68.7 | 55.0 | 5 | 5 | 12.6 | 12.9 |
| Example 9 | 206.3 | 68.7 | 55.0 | 5 | 4 | 11.9 | 12.2 |
| Comp. Ex. 1 | 245.0 | 81.7 | 3.3 | 6 | 5 | 0.9 | 1.9 |
| Comp. Ex. 2 | 240.3 | 80.1 | 9.6 | 6 | 5 | 1.5 | 2.3 |
| Comp. Ex. 3 | 238.0 | 79.3 | 12.7 | 7 | 5 | 2.1 | 2.6 |
| Comp. Ex. 4 | 238.0 | 79.3 | 12.7 | 8 | 5 | 1.9 | 2.5 |
| Comp. Ex. 5 | 238.0 | 79.3 | 12.7 | 6 | 6 | 3.1 | 3.4 |
| Comp. Ex. 6 | 238.0 | 79.3 | 12.7 | 6 | 7 | 3.3 | 3.6 |
| Comp. Ex. 7 | 225.0 | 75.0 | 30.0 | 7 | 5 | 5.9 | 6.2 |
| Comp. Ex. 8 | 225.0 | 75.0 | 30.0 | 8 | 5 | 5.5 | 5.8 |
| Comp. Ex. 9 | 225.0 | 75.0 | 30.0 | 6 | 6 | 7.2 | 7.5 |
| Comp. Ex. 10 | 225.0 | 75.0 | 30.0 | 6 | 7 | 8.0 | 8.3 |
| Comp. Ex. 11 | 206.3 | 68.7 | 55.0 | 7 | 5 | 11.4 | 11.7 |
| Comp. Ex. 12 | 206.3 | 68.7 | 55.0 | 8 | 5 | 10.8 | 11.1 |
| Comp. Ex. 13 | 206.3 | 68.7 | 55.0 | 6 | 6 | 13.5 | 13.8 |
| Comp. Ex. 14 | 206.3 | 68.7 | 55.0 | 6 | 7 | 14.7 | 15.0 |

I claim:

1. An abrasive tape comprising a flexible substrate and an abrasive layer which is overlaid on the flexible substrate and which contains abrasive grains and a binder, wherein the abrasive grains comprise:

i) first abrasive grains, which have a mean grain diameter falling within the range of 0.07 μm to 0.40 μm and a Molls hardness falling within the range of 5 to 7, ii) second abrasive grains, which have a mean grain diameter falling within the range of 0.20 μm to 0.60 μm and a Molls hardness not lower than 8.5, and iii) fine diamond grains, which have a mean grain diameter falling within the range of 0.5 μm to 3.0 μm, the proportion of the weight of the fine diamond grains being not lower than 4% with respect to the total weight of the first abrasive grains and the second abrasive grains.

2. An abrasive tape as defined in claim 1 wherein, in the distribution of the grain sizes of the fine diamond grains, the proportion of the volume of the fine diamond grains having grain sizes not larger than 33% of the mean grain diameter is not higher than 6% with respect to the whole volume of the fine diamond grains contained in the abrasive grains, and the proportion of the volume of the fine diamond grains having grain sizes not smaller than 428% of the mean grain diameter is not higher than 5% with respect to the whole volume of the fine diamond grains contained in the abrasive grains.

3. An abrasive tape as defined in claim 1 wherein the proportion of the total weight of the first abrasive grains, the second abrasive grains, and the fine diamond grains with respect to the weight of total solids, which are contained in the abrasive layer comprising the abrasive grains and the binder, falls within the range of 85% to 95%.

4. An abrasive tape as defined in claim 3 wherein the proportion of the total weight of the first abrasive grains, the second abrasive grains, and the fine diamond grains with respect to the weight of total solids, which are contained in the abrasive layer comprising the abrasive grains and the binder, falls within the range of 90% to 95%.

5. An abrasive tape as defined in claim 1 wherein the surface roughness of the abrasive layer falls within the range of 0.046 μm to 0.130 μm.

6. An abrasive tape as claimed in claim 1 wherein said first abrasive grains are selected form one of the following, α- Fe₂O₃, TiO₂, SiO₂, SnO₂ and the second abrasive grains are selected from one of the following, Cr₂O₃, Al₂O₃, SiC.

* * * * *